US012624780B2

(12) United States Patent
Lundstrom

(10) Patent No.: US 12,624,780 B2
(45) Date of Patent: May 12, 2026

(54) MECHANICAL JOINT RESTRAINT WITH WEDGE ASSEMBLIES INCLUDING COLLAR BOLTS

(71) Applicant: EBAA IRON, INC., Eastland, TX (US)

(72) Inventor: Michael L. Lundstrom, Eastland, TX (US)

(73) Assignee: EBAA IRON, INC., Eastland, TX (US)

( * ) Notice: Subject to any disclaimer, the term of this patent is extended or adjusted under 35 U.S.C. 154(b) by 0 days.

(21) Appl. No.: 19/044,742

(22) Filed: Feb. 4, 2025

(65) Prior Publication Data

US 2025/0257825 A1      Aug. 14, 2025

Related U.S. Application Data

(60) Provisional application No. 63/551,306, filed on Feb. 8, 2024.

(51) Int. Cl.
*F16L 23/00* (2006.01)
*F16L 23/028* (2006.01)

(52) U.S. Cl.
CPC ......... *F16L 23/003* (2013.01); *F16L 23/0286* (2013.01)

(58) Field of Classification Search
CPC ......... F16L 21/08; F16L 21/007; F16L 21/03; F16L 17/00; F16L 17/02; F16L 25/06; F16L 25/065; F16L 47/08; F16L 47/12; F16L 19/06; F16L 19/065; F16L 19/0656; F16L 23/003; F16L 23/0286; F16L 23/024
See application file for complete search history.

(56) References Cited

U.S. PATENT DOCUMENTS

| | | | | |
|---|---|---|---|---|
| 4,092,036 A | * | 5/1978 | Sato ...................... | F16L 25/065 |
| | | | | 285/321 |
| 4,627,774 A | | 12/1986 | Bradley | |
| 4,848,808 A | * | 7/1989 | Pannell ................... | F16L 21/08 |
| | | | | 285/39 |
| 5,544,922 A | * | 8/1996 | Shumard ............... | F16L 23/024 |
| | | | | 285/23 |
| 5,772,252 A | * | 6/1998 | Malani .................. | F16L 25/065 |
| | | | | 411/389 |
| 5,951,066 A | * | 9/1999 | Lane ...................... | E21B 33/03 |
| | | | | 285/364 |

(Continued)

OTHER PUBLICATIONS

Ebaa Iron Inc., Megalug Series 1100: Mechanical Joint Restraint for Ductile Iron Pipe Brochure, 2023, USA, 6 pages.

*Primary Examiner* — Aaron M Dunwoody

(74) *Attorney, Agent, or Firm* — HAYNES AND BOONE, LLP

(57) ABSTRACT

A joint restraint assembly for a pipe, the joint restraint assembly including an annular body, and a wedge assembly received within an opening of a wedge housing of the annular body. The wedge assembly includes a bolt including a flange, and a low-friction material positioned between the flange and an interior surface of the wedge housing, which low-friction material is adapted to slidably engage the interior surface during relative movement between the wedge assembly and the wedge housing. A wedge member is attached to the bolt so that the flange is positioned between at least a portion of the low-friction material and at least a portion of the wedge member. The wedge member is adapted to engage the pipe.

20 Claims, 11 Drawing Sheets

(56)     References Cited

U.S. PATENT DOCUMENTS

| | | | |
|---|---|---|---|
| 6,173,993 B1 * | 1/2001 | Shumard ............... | F16L 25/065 |
| | | | 285/23 |
| 9,822,910 B2 * | 11/2017 | Bowsher ................. | F16L 21/08 |
| 10,400,925 B2 * | 9/2019 | Pendleton ............... | F16L 23/08 |
| 2004/0046389 A1 * | 3/2004 | Smith ..................... | F16L 21/08 |
| | | | 285/337 |
| 2006/0012172 A1 * | 1/2006 | Kennedy, Jr. ........... | F16L 21/04 |
| | | | 285/332.2 |
| 2011/0291409 A1 * | 12/2011 | Kennedy, Jr. ......... | F16L 25/065 |
| | | | 285/421 |
| 2016/0341343 A1 * | 11/2016 | Bowsher ................. | F16L 21/08 |
| 2025/0257825 A1 * | 8/2025 | Lundstrom ......... | F16L 23/0286 |

* cited by examiner

MECHANICAL JOINT RESTRAINT WITH WEDGE ASSEMBLIES INCLUDING COLLAR BOLTS

CROSS-REFERENCE TO RELATED APPLICATIONS

This application claims priority to, and the benefit of, the filing date of U.S. Patent Application No. 63/551,306, filed Feb. 8, 2024, the entire disclosure of which is hereby incorporated herein by reference and forms part of the present disclosure.

This application is related to U.S. patent application Ser. No. 08/425,874, filed Apr. 21, 1995, now U.S. Pat. No. 5,544,922, the entire disclosure of which is hereby incorporated herein by reference and forms part of the present disclosure.

FIELD OF THE DISCLOSURE

The present disclosure relates, in general, to joint restraints, and more particularly, to wedge assemblies that increase the grip of a joint restraint with respect to pipes joined together using the joint restraint.

BACKGROUND

Some joint restraints are used to connect, seal, and prevent the disengagement of, axially-aligned pipes. In some applications, a first pipe is received within a second pipe, which includes an enlarged mouth, a packing cavity, and a terminal flange. In use, a joint restraint is connected to both the outer surface of the first pipe and the terminal flange of the second pipe, so as to hold the two pipes together. A wedge assembly of the joint restraint facilitates the connection of the first and second pipes by gripping the first pipe in a two-step mechanical action. After the joint restraint is connected to the flange, a twist-off nut of the wedge assembly is tightened to a predetermined torque at which point the wedge assembly is set against the outer surface of the first pipe, providing an initial grip on the first pipe. Upon pressurization of the piping system, the wedge assembly is forced rearward within the joint restraint. As the wedge assembly moves rearward, it is also forced downward (or wedged) by an inclined plane surface of the joint restraint, inducing a radially inward force on the wedge assembly. The radially inward force on the wedge assembly substantially increases the grip of the wedge assembly on the first pipe.

Once an initial grip force substantial enough to initiate the slidable engagement between the wedge assembly and the inclined plane surface has been achieved, promoting such slidable engagement may be desirable for one or more reasons such as, for example, improving grip strength and/or reducing the incidence of slippage between the wedge assembly and the pipe.

DETAILED DESCRIPTION

Figure 1:
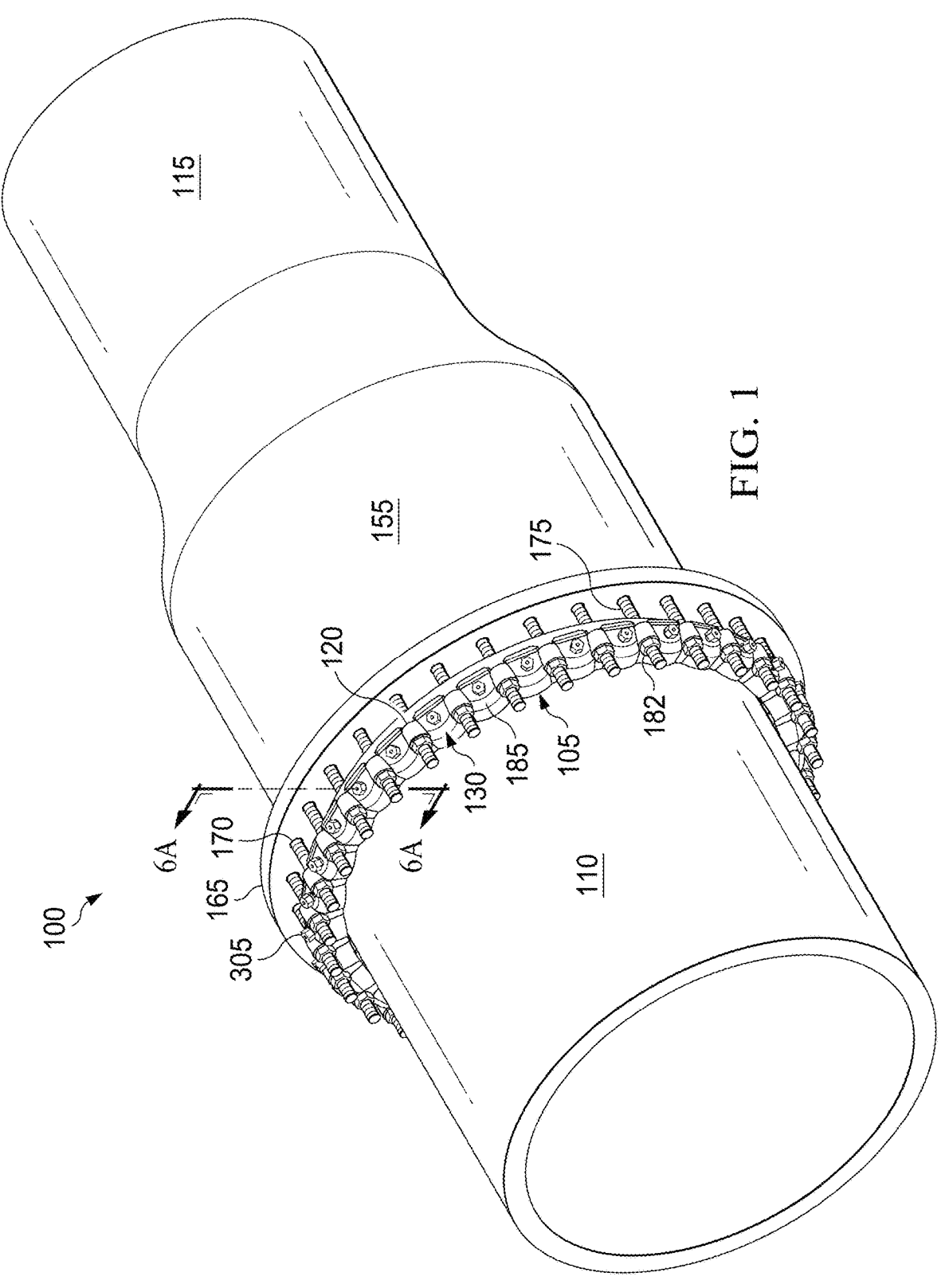
FIG. 1 illustrates a perspective view of a pipe junction assembly including a joint restraint in a partially installed configuration, according to one or more embodiments.

The following disclosure provides many different embodiments. Specific examples of components and arrangements are described below to simplify the present disclosure. These are, of course, merely examples and are not intended to be limiting. In addition, the present disclosure may repeat reference numerals and/or letters in the various embodiments. This repetition is for the purpose of simplicity and clarity and does not in itself dictate a relationship between the various embodiments and/or configurations discussed.

Referring to FIG. 1, a pipe junction assembly 100 is shown and described according to one or more embodiments. The pipe junction assembly includes a joint restraint 105, a first pipe 110, and a second pipe 115. In one or more embodiments, the first pipe 110 is received through the joint restraint 105 such that the joint restraint 105 is mounted on the first pipe 110. In one or more embodiments, the first pipe 110 is received within and coupled to the second pipe 115. In one or more embodiments, the first pipe 110 may be a pipe, a pipe joint, a pipe junction, or a pipe fitting. In one or more embodiments, the second pipe 115 may be a pipe, a pipe joint, a pipe junction, or a pipe fitting.

In one or more embodiments, an end portion 145 (shown in FIGS. 6A-6C) of the first pipe 110 is inserted into, or received within, an inner circular space 150 (shown in FIG. 2) defined by the annular body 120 of the joint restraint 105. The end portion 145 of the first pipe 110 is then received within, or coupled with, an enlarged mouth 155 formed at an axially adjacent end portion of the second pipe 115. In one or more embodiments, the first pipe 110, the second pipe 115, and the joint restraint 105 are all coaxially aligned when assembled. In one or more embodiments, a packing material 160 (shown in FIGS. 6A-6C) is provided at the opening of the enlarged mouth 155. The packing material 160 is positioned circumferentially around the first pipe 110 and radially between the first pipe 110 and the second pipe 115 such that the packing material 160 provides a seal and facilitates sealing engagement of the first pipe 110 and the second pipe 115.

The second pipe 115 includes an annular flange 165 located at an end portion of the enlarged mouth 155 of the second pipe 115 to facilitate attachment of the joint restraint 105 to the second pipe 115 and thus facilitate coupling of the first pipe 110 and the second pipe 115. In one or more embodiments, the annular flange 165 includes a plurality of holes 170 extending through the annular flange parallel to an axial extension of the second pipe 115 to facilitate attachment to the joint restraint 105. In one or more embodiments, the plurality of holes 170 are equally distributed circumferentially about the annular flange 165.

Figure 2:
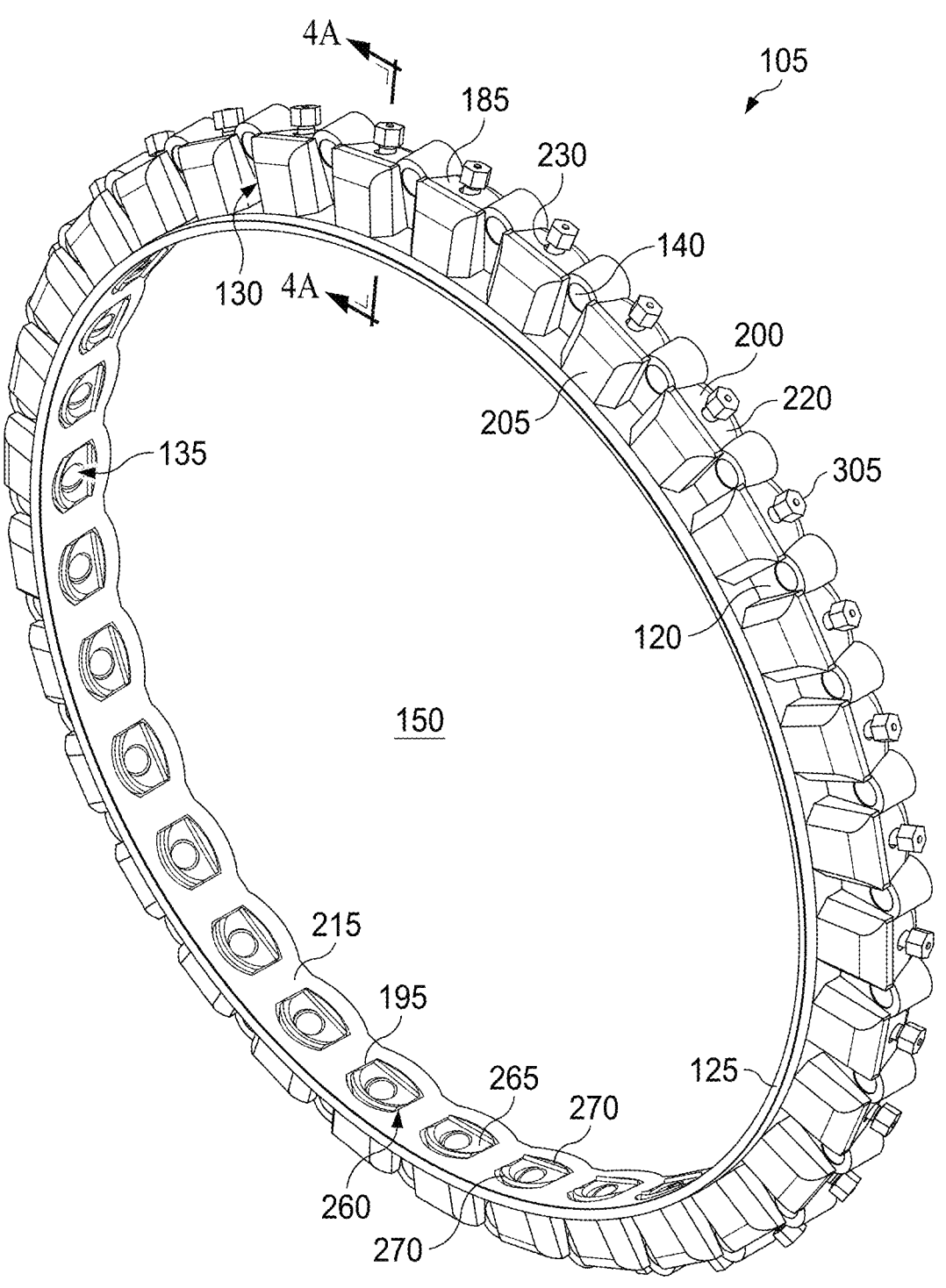
FIG. 2 illustrates a perspective view of the joint restraint of FIG. 1, including a wedge assembly, in an uninstalled configuration, according to one or more embodiments.

FIG. 2 illustrates the joint restraint 105 of FIG. 1 in further detail. Referring to FIG. 2, with continued reference to FIG. 1, the joint restraint 105 includes a substantially annular body 120, an annular projection 125, a plurality of wedge assembly housings 130 each configured to receive at least a portion of a wedge assembly 135, and a plurality of holes 140 extending through the annular body 120 of the joint restraint 105.

In one or more embodiments, the plurality of holes 140 of the joint restraint 105 extend through the annular body 120 parallel to an axial extension of the annular body 120 and parallel to an axial extension of the first pipe 110 on which the joint restraint 105 is mounted. In one or more embodiments, the plurality of holes 140 are equally distributed circumferentially about the annular body 120 of the joint restraint 105. In one or more embodiments, the plurality of wedge assembly housings 130 are equally distributed circumferentially about the annular body 120. In one or more embodiments, the distribution of the plurality of holes 140 is circumferentially offset from the distribution of the plurality of wedge assembly housings 130 such that at least one hole of the plurality of holes 140 is positioned circumferentially between every two wedge assembly housings 130. In one or more embodiments, the radial and circumferential spacing of the plurality of holes 140 of the joint restraint 105 and of the plurality of holes 170 of the annular flange 165 are the same.

When the joint restraint 105 is mounted on the first pipe 110, the annular body 120 may be rotated and oriented such that the plurality of holes 140 of the joint restraint 105 are axially aligned, and adapted to cooperate with, the plurality of holes 170 of the annular flange 165 such that each set of aligned holes is adapted to receive a bolt 175 with a head (not shown). The bolt 175 is received through each set of aligned holes and a nut 182 is received onto the end of the bolt 175 opposite the head. As the annular body 120 is connected to the annular flange 165 via tightening of each nut 182 onto each bolt 175, the annular projection 125 pushes against the packing material 160 and packs the packing material 160 into the opening of the enlarged mouth 155, creating the seal between the first pipe 110 and the second pipe 115.

As shown in FIG. 2, each wedge assembly housing 130 of the joint restraint 105 includes a housing block 185 adapted to receive one wedge assembly 135. Each housing block 185 includes a front wall 205 integral with the annular body 120, an axially opposing rear wall 210 (shown in FIG. 3A) that is also integral with the annular body 120, and an integral radially outer wall 200 that extends axially between the front wall 205 and the rear wall 210. Each housing block 185 also includes an open mouth 195 that extends radially into at least a portion of the housing block 185 from a radially inner surface 215 of the annular body 120 such that the open mouth 195 of each housing block 185 faces, or is adjacent to, the first pipe 110 when the joint restraint 105 is installed on the first pipe 110. Defined within each housing block 185 are a plurality of integral sidewalls 190 (shown in FIG. 3B).

The radially outer wall 200 of each housing block 185 includes an external side 220, an internal side 225 (shown in FIG. 3B), and a non-threaded, substantially elliptical hole 230 extending through the radially outer wall 200 between the external side 220 and the internal side 225. The radially outer wall 200 and the longitudinal axis of the elliptical hole 230 are inclined with respect to the longitudinal axis of the first pipe 110. In the embodiment shown, the front wall 205 is radially taller than the rear wall 210 such that the radially outer wall 200 is inclined from the rear wall 210 to the front wall 205.

Figure 3A:
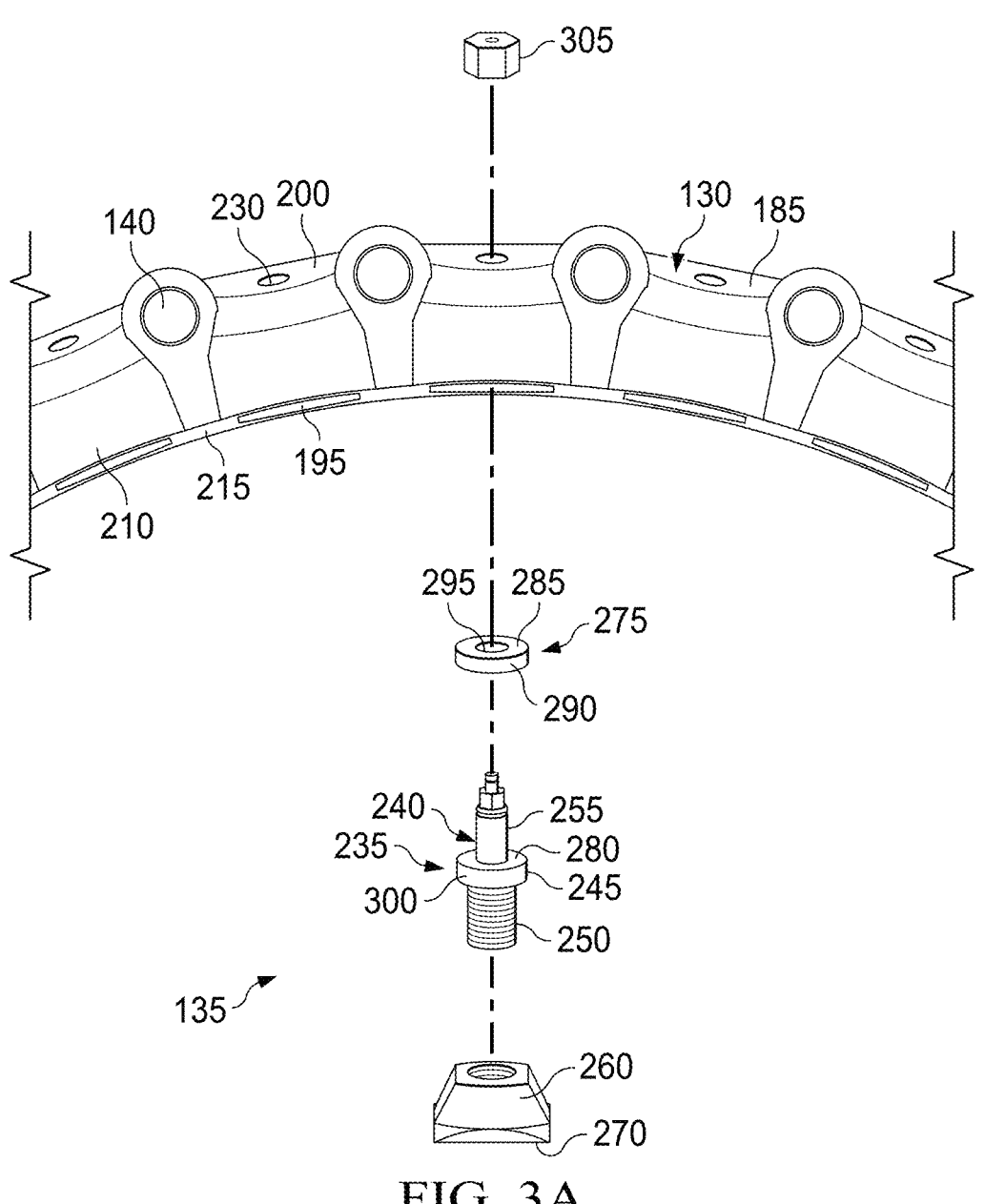
FIG. 3A illustrates an exploded view of a portion of the joint restraint and the wedge assembly of FIG. 2, the wedge assembly including a collar bolt and a cap, according to one or more embodiments.

FIG. 3A illustrates an exploded view of a portion of the joint restraint 105 and of a wedge assembly 135 of the plurality of wedge assemblies 135. Each housing block 185 is adapted to receive one wedge assembly 135 via each open mouth 195. Each wedge assembly 135 includes a collar bolt 235 having a shank 240, an integral flange 245 formed on the shank 240, a threaded portion 250 below the flange 245, and an upper portion 255 above the flange 245. The upper portion 255 of the collar bolt 235 is adapted to be received in and through the elliptical hole 230 from the internal side 225 of the radially outer wall 200 before the joint restraint 105 is installed on the first pipe 110 (i.e., before the first pipe 110 is received through the annular space 150 of the annular body 120). The flange 245 prevents the wedge assembly 135 from passing through the elliptical hole 230 in the radially outer wall 200. One of ordinary skill in the art will recognize that other arrangements can prevent passage through the elliptical hole 230, including the use of a stepped bolt diameter, wherein the diameter of the lower portion of the bolt is greater than that of the elliptical hole 230.

Each wedge assembly 135 further includes an internally reverse-threaded pipe-pressing member 260 attached to the bolt 175 so that the annular flange 165 is positioned between at least a portion of the cap 275 and at least a portion of the pipe-pressing member 260. More particularly, the pipe-pressing member 260 is mounted on the threaded portion 250 of the shank 240 and adapted to be received within the open mouth 195 of each housing block 185 when the wedge assembly 135 is installed therein. When the pipe-pressing member 260 is received within the open mouth 195 of the housing block 185, the pipe-pressing member 260 is prevented from turning. A bottom surface 265 (shown in FIG. 3B) of the pipe-pressing member 260 includes gripping edges 270 that are adapted to securely bite into the wall of the first pipe 110, as will be described in more detail below.

In one or more embodiments, the wedge assembly 135 may include a retainer clip positioned between the flange 245 and the pipe-pressing member 260 and adapted to retain the wedge assembly 135 within the housing block 185 via cooperation with associated retainer clip-stops defined by the integral sidewalls 190 of the housing block 185, as shown and described in U.S. patent application Ser. No. 08/425,874, filed Apr. 21, 1995, now U.S. Pat. No. 5,544, 922, the entire disclosure of which is hereby incorporated herein by reference and forms part of the present disclosure.

The wedge assembly 135 further includes a cap 275. In the embodiment shown, the cap 275 includes a top portion, such as a top wall 285, and a side portion, such as a side wall 290, extending downward from the outer radial edge of the top wall 285. In one or more embodiments, the top wall 285 is disk shaped with an opening 295 (or hole) extending through the center of the top wall 285. The opening 295 extending through the top wall 285 is sized to receive the upper portion 255 of the collar bolt 235 so that the cap 275 may be installed from the top of the collar bolt 235 and positioned down around the upper portion 255 of the collar bolt 235. In one or more embodiments, the side wall 290 of the cap 275 may be omitted, so that the cap 275 is a disk with just the top wall 285. In one or more embodiments, instead of having a circular shape as shown in the figures, the top wall 285 has a square shape, a rectangular shape, a hexagonal shape, an oval shape, or another shape. In one more embodiments, instead of having the circular shape as shown in the figures, the top wall 285 has a square shape, a rectangular shape, a hexagonal shape, an oval shape, or another shape, and the side wall 290 has a shape other than the cylindrical shape shown in the figures.

Figure 3B:
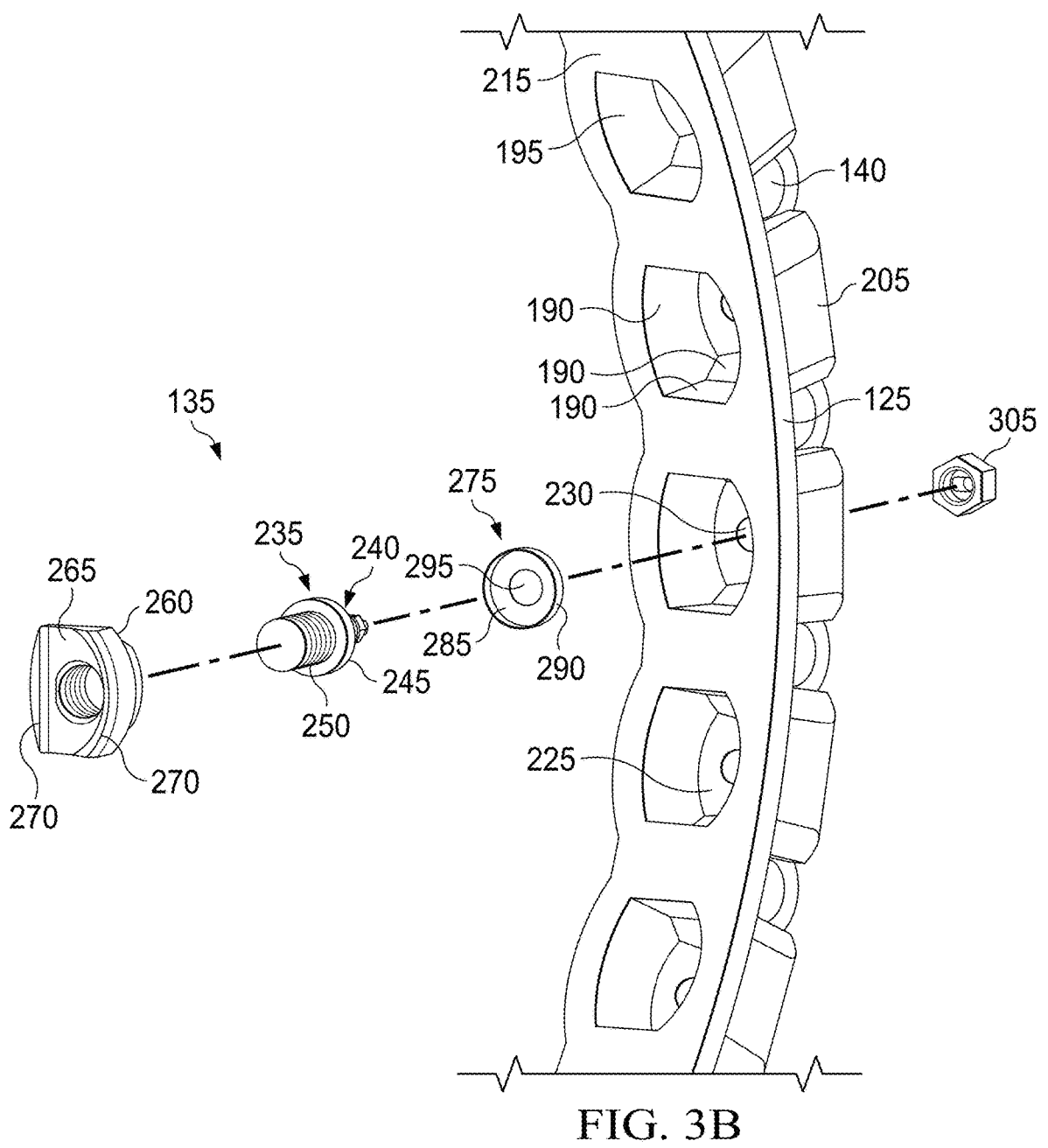
FIG. 3B illustrates another exploded view of the portion of the joint restraint and the wedge assembly of FIG. 2, according to one or more embodiments.

FIG. 3B illustrates another exploded view of the portion of the joint restraint 105 and of the wedge assembly 135 from a different perspective.

Figure 4A:
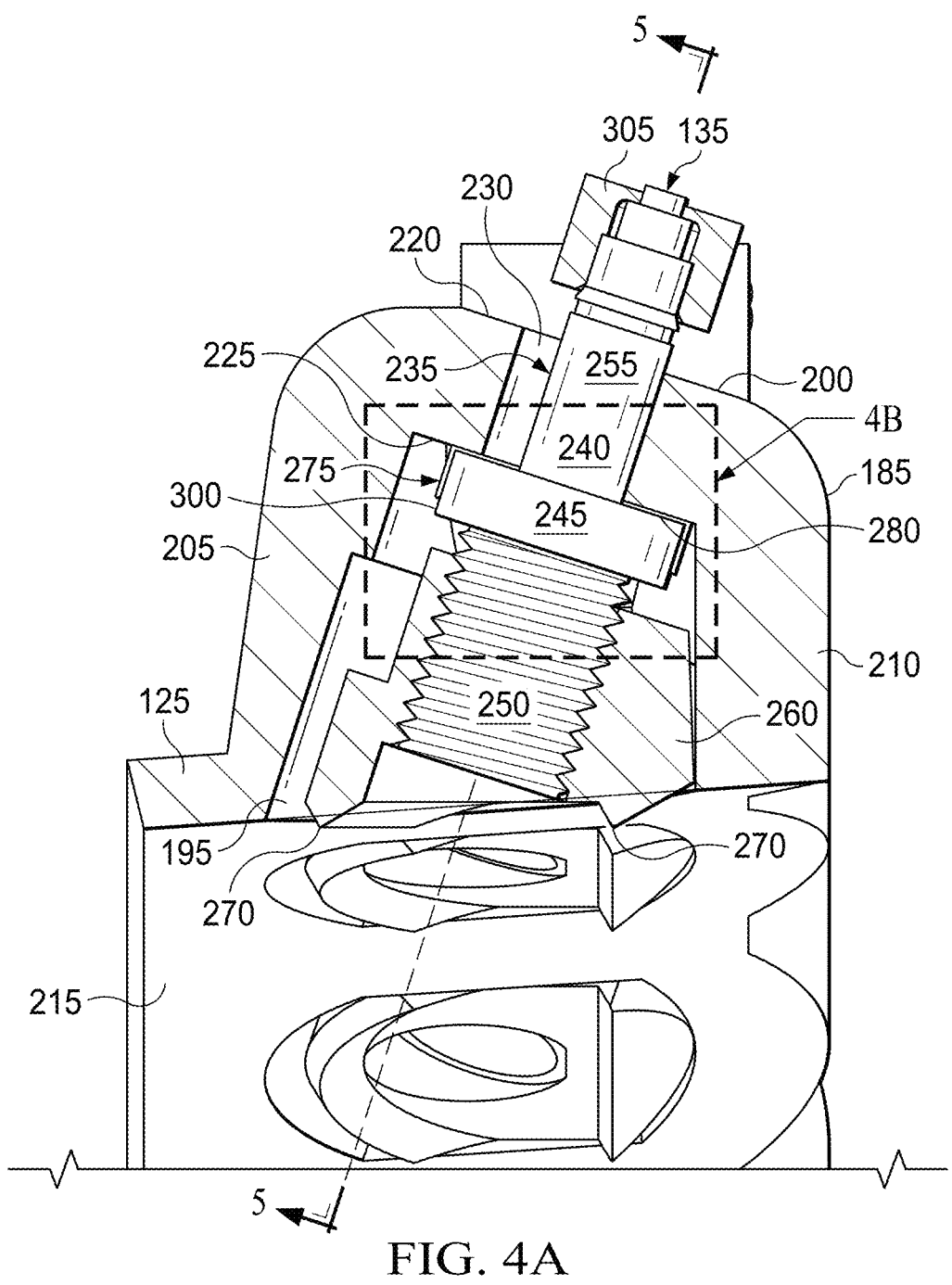
FIG. 4A illustrates a cross-sectional view of another portion of the joint restraint of FIG. 2, taken along line 4A-4A of FIG. 2, according to one or more embodiments.
Figure 4B:
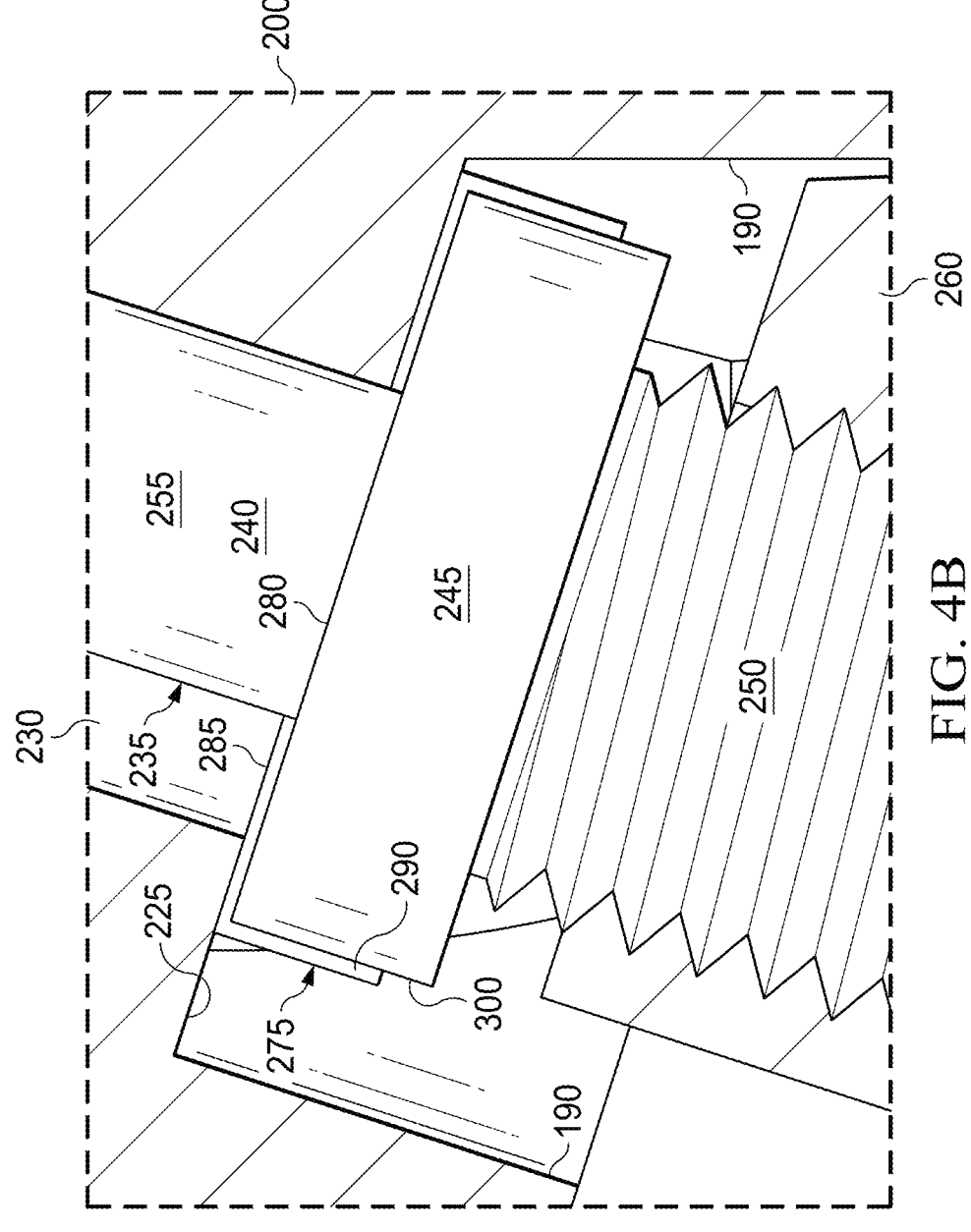
FIG. 4B illustrates an enlarged view of portion 4B of FIG. 4A, according to one or more embodiments.

FIG. 4A illustrates a cross-sectional view of the joint restraint 105 taken along line 4A-4A of FIG. 2. FIG. 4B illustrates an enlarged view of portion 4B of FIG. 4A.

FIGS. 4A and 4B illustrate the wedge assembly 135 positioned within the housing block 185 of the joint restraint 105. As shown, the cap 275 is positioned over at least a portion of an upper surface 280 of the flange 245 such that when the wedge assembly 135 is installed within the housing block 185 of the joint restraint 105, the cap 275 is positioned between the upper surface 280 of the flange 245 and the internal side 225 of the radially outer wall 200 of the housing block 185. When installed on the flange 245, the top wall 285 of the cap 275 extends across the entire upper surface 280 of the flange 245 about the upper portion 255 of the collar bolt 235 and the side wall 290 of the cap 275 wraps over the outer radial edge of the flange 245 and extends downward around an outer surface 300 of the flange 245 along at least a portion of the longitudinal length of the flange 245. The side wall 290 extending about the outer surface 300 of the flange 245 facilitates retention of the cap 275 on the flange 245 between the upper surface 280 of the flange 245 and the internal side 225 of the radially outer wall 200 of the housing block 185.

In one or more embodiments, the side wall 290 of the cap 275 may be omitted such that the cap 275 includes only the top wall 285; the top wall 285 is an example of a top portion of the cap 275. In such embodiments, the cap 275 may be retained on the flange 245 between the upper surface 280 of the flange 245 and the internal side 225 of the radially outer wall 200 of the housing block 185 solely by the extension of the upper portion 255 of the collar bolt 235 through the opening 295 in the top wall 285 of the cap 275. In such embodiments, the cap 275 may resemble a disk, a washer, or a spacer.

In operation, as will be discussed in more detail below with respect to FIGS. 6A-6C, the wedge assembly 135 translates or slides relative to the housing block 185 of the joint restraint 105 as the pipes are pressurized and, as a result of the pressurization, urged to separate. During this relative movement between the wedge assembly 135 and the housing block 185, the upper surface 280 of the flange 245 slides against, and is forced downward by, the incline of the internal side 225 of the radially outer wall 200 of the housing block 185. This downward force on the wedge assembly 135 causes the pipe-pressing member 260 to dig into and increase the grip of the joint restraint 105 on the first pipe 110.

In order to promote the relative movement between the wedge assembly 135 and the housing block 185 to increase the grip on the first pipe 110, the cap 275 is made of a material that is adapted to reduce the coefficient of friction between the sliding contact surfaces of the upper surface 280 of the flange 245 and the internal side 225 of the radially outer wall 200 of the housing block 185 without reducing the initial grip between the pipe-pressing member 260 and the first pipe 110. By reducing the coefficient of friction between the flange 245 and the internal side 225 of the radially outer wall 200 of the housing block 185, the wedging of the pipe-pressing member 260 radially against the first pipe 110 is improved while reducing any incidence of the pipe-pressing member 260 slipping or sliding axially along the surface of the first pipe 110. These benefits are realized with respect to a variety of pipe joining applications, including applications utilizing large diameter piping with hard outer surfaces, which have traditionally been some of the more difficult types of pipes to grip and hold joined together.

In one or more embodiments, the implementation of a low friction material between the flange 245 and the housing block 185 may take the form of the cap 275 as described above. In one or more other embodiments, the low friction material may be mounted, fastened, or adhered to the upper surface 280 of the flange 245 and/or to the internal side 225 of the radially outer wall 200. In one or more other embodiments, pieces or strips of the low friction material may be mounted, fastened, or adhered to a portion of the upper surface 280 of the flange 245 and/or to the internal side 225 of the radially outer wall 200. In one or more other embodiments, a low friction material may be sprayed, coated, or dipped onto the flange 245 and/or the internal side 225 of the radially outer wall 200. In still other embodiments, a mechanical device may be implemented to reduce friction between the collar bolts 235 and the housing block 185, such as a roller ball bearing. In addition, a grease could be used to reduce the friction between the flange 245 and the housing block 185; however, grease would be a less suitable option as the grease could run onto the pipe and lead to slippage between the pipe-pressing member 260 and the first pipe 110.

In one or more embodiments, the cap 275 is composed of a low friction material. In one or more embodiments, the low friction material is ultra-high molecular weight polyethylene (UHMW), but other materials are contemplated. In one or more other embodiments, the low friction material is nylon. In one or more other embodiments, the low friction material includes one or more of UHMW, nylon, one or more other low friction materials, or any combination thereof.

Once the wedge assemblies are assembled within the clamping block, a twist-off nut 305 may be attached to each wedge assembly 135 in accordance with U.S. patent application Ser. No. 06/737,807, filed May 23, 1985, now U.S. Pat. No. 4,627,774, the entire disclosure of which is hereby incorporated herein by reference and forms part of the present disclosure.

Figure 5:
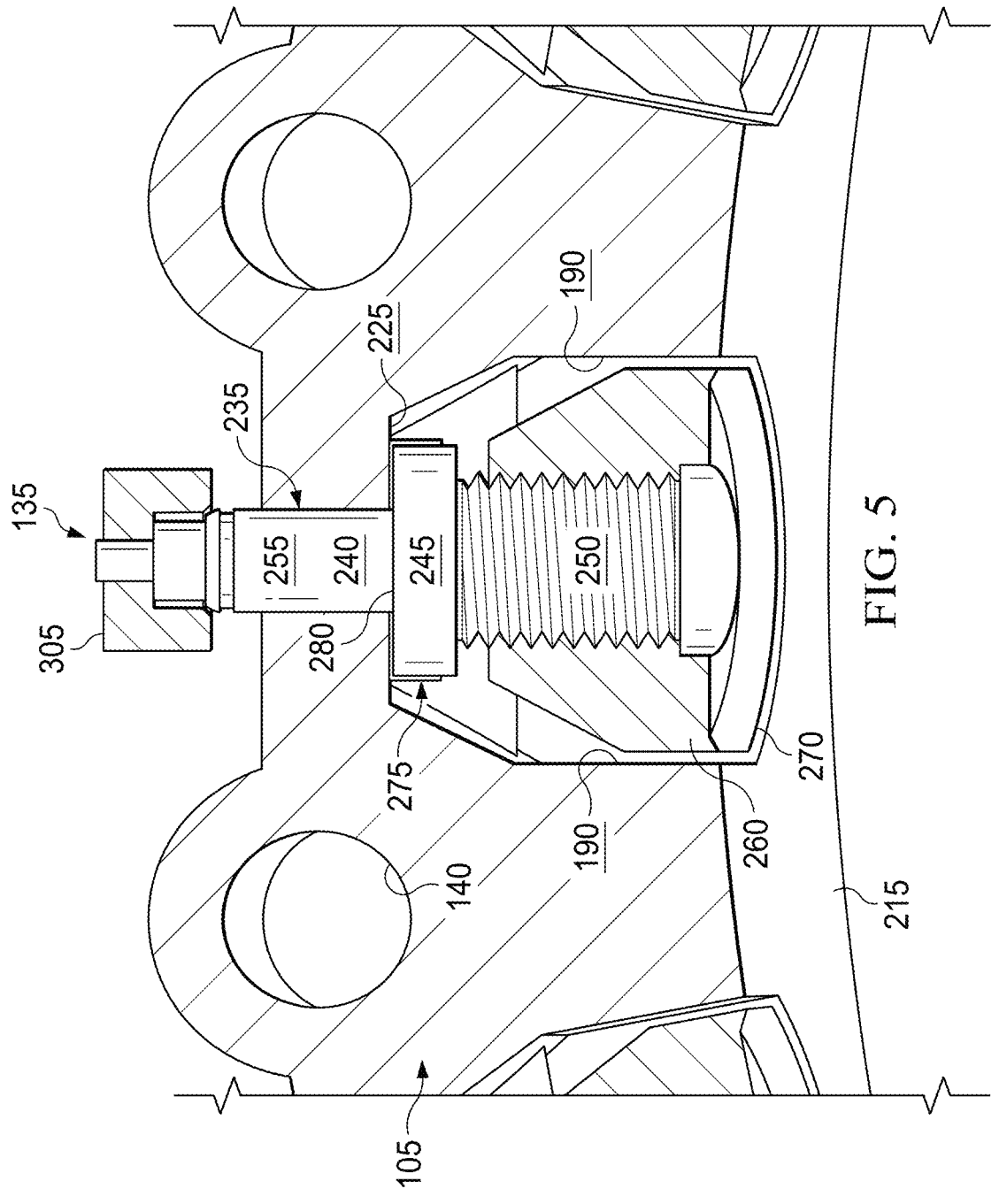
FIG. 5 illustrates a cross-sectional view of yet another portion the joint restraint of FIG. 2, taken along line 5-5 of FIG. 4A, according to one or more embodiments.

FIG. 5 illustrates another cross-sectional view of the joint restraint 105 of FIG. 4A, taken along line 5-5 of FIG. 4A.

Figure 6A:
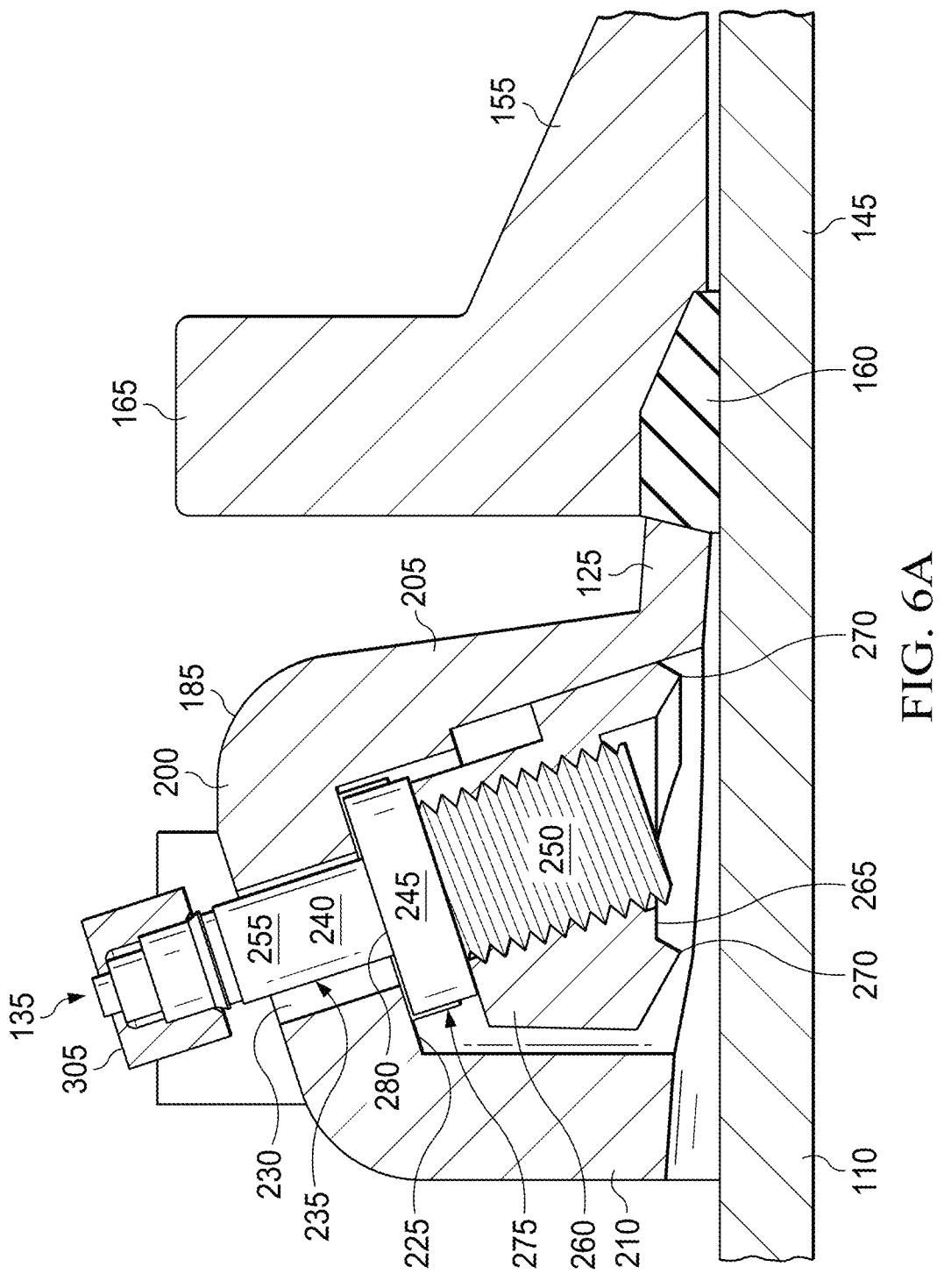
FIG. 6A illustrates a cross-sectional view of the pipe junction assembly of FIG. 1, taken along line 6A-6A of FIG. 1, according to one or more embodiments.
Figure 6B:
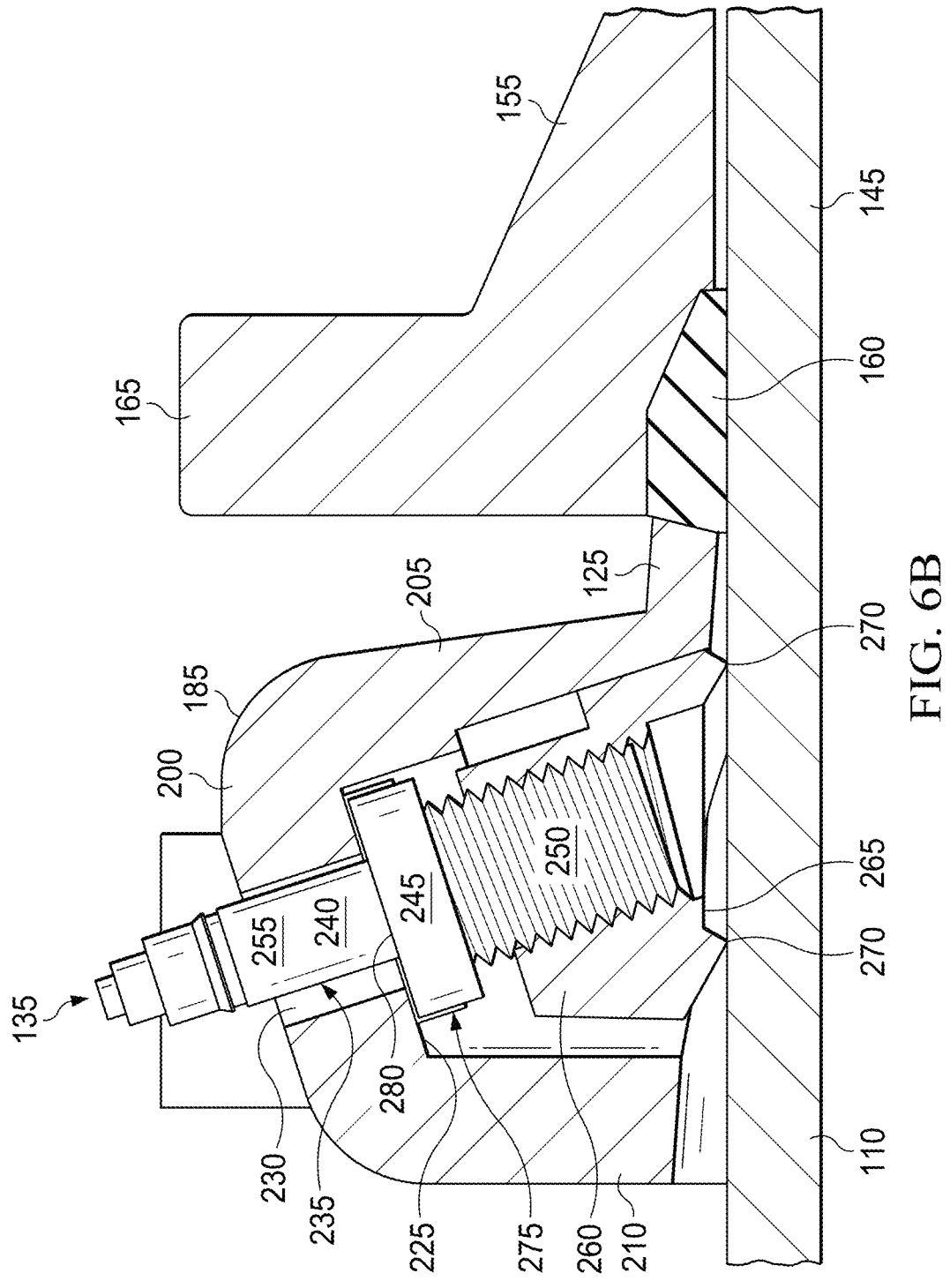
FIG. 6B illustrates a cross-sectional view similar to that of FIG. 6A, but depicting the joint restraint of FIG. 1 in an installed configuration, according to one or more embodiments.
Figure 6C:
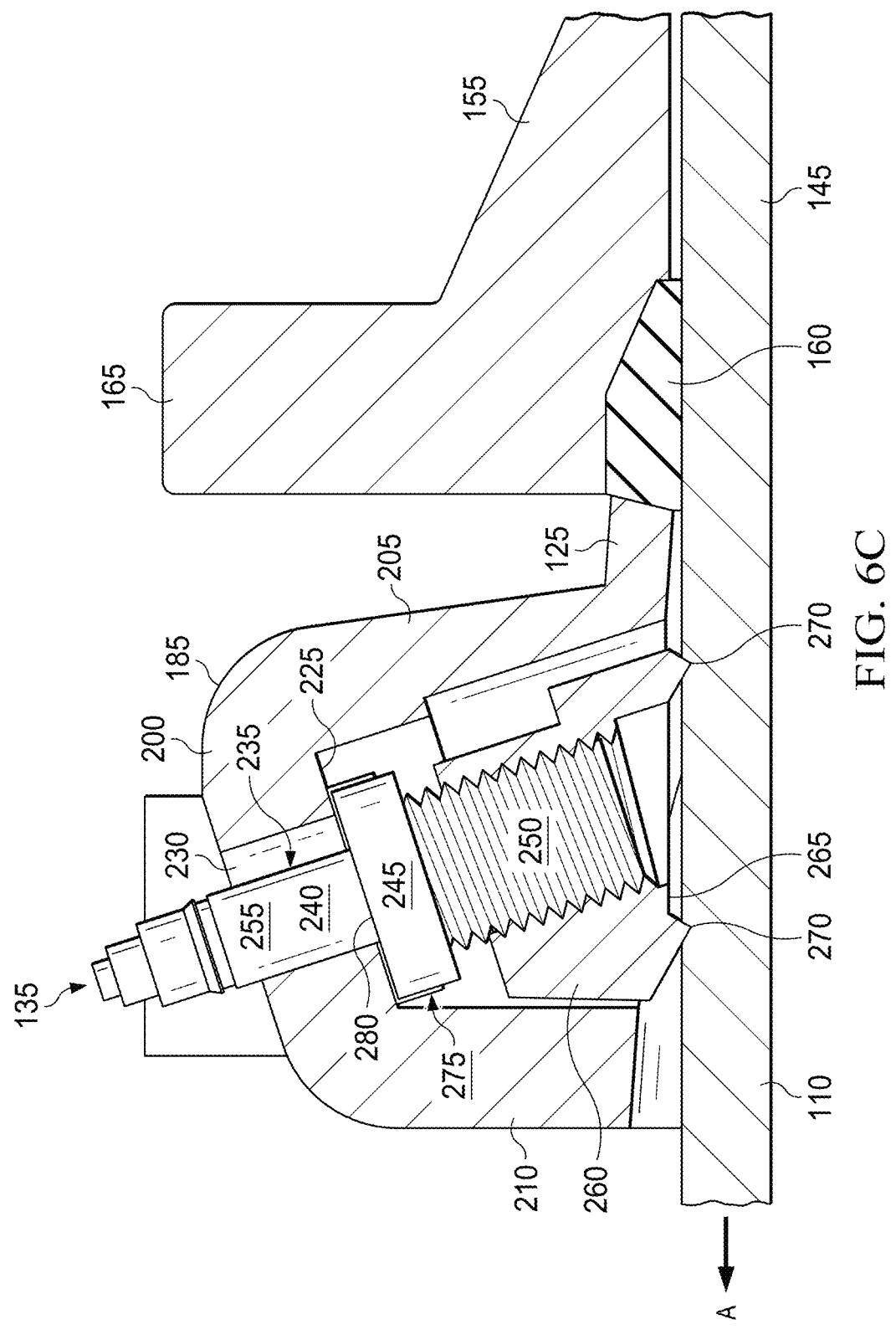
FIG. 6C illustrates a cross-sectional view similar to that of each of FIGS. 6A and 6B, but depicting the joint restraint of FIG. 1 in an operational configuration, according to one or more embodiments.

Referring now to FIGS. 6A-6C, with continued reference to FIGS. 1-5, installation of the pipe junction assembly 100, including the joint restraint 105, will be described in further detail, according to one or more embodiments.

First, the joint restraint 105 is prepared for installation on the first pipe 110. Each wedge assembly 135 is prepared by threadably engaging the threaded portion 250 of the shank 240 of the collar bolt 235 with the internally reverse-threaded pipe-pressing member 260. Then the cap 275 is assembled onto the upper portion 255 of the collar bolt 235 and seated down onto the upper surface 280 of the flange 245. The cap 275 is assembled onto the collar bolt 235 prior to the upper portion 255 of the collar bolt 235 being received through the elliptical hole 230 of the housing block 185. In one or more embodiments, the cap 275, or the low friction material, may be applied to the collar bolt 235 or to the housing block 185 prior to the pipe-pressing member 260 being assembled onto the collar bolt 235.

Next, the wedge assembly 135 is received into the joint restraint 105 through the open mouth 195 of the housing block 185 and the upper portion 255 of the collar bolt 235 is received through the elliptical hole 230 in the radially outer wall 200 of the housing block 185. The collar bolt 235 is prevented from extending entirely through the elliptical hole 230 by the flange 245. In order to retain the wedge assembly 135 within the housing block 185 prior to the joint restraint 105 being installed onto the first pipe 110, the twist-off nut 305 is attached to the collar bolt 235 on the external side 220 of the radially outer wall 200. Each wedge assembly 135 is installed into the joint restraint 105 in this manner prior to installation of the joint restraint 105 onto the first pipe 110.

In subsequent installation of the joint restraint 105, the first pipe 110 is received within the annular space 150 defined by the annular body 120 of the joint restraint 105. In one or more embodiments, the joint restraint 105 is placed onto and around the first pipe 110. In one or more embodiments, the packing material 160 is also assembled onto the first pipe 110 after the joint restraint 105 has been assembled onto the first pipe 110. The annular body 120 of the joint restraint 105 is then rotated until the holes 140 of the annular body 120 and the holes 170 of the annular flange 165 of the second pipe 115 are aligned such that bolts 175 may be inserted through each set of holes and engagingly mated with complementary nuts 182 in order to couple the joint restraint 105 to the second pipe 115. The nuts 182 and bolts 175 are then tightened such that the annular body 120 and the annular flange 165 are drawn closer together and such that the annular projection 125 sealingly abuts against the packing material 160 and presses the packing material 160 into the enlarged mouth 155 of the second pipe 115. The packing material 160 is compressed to seal the joint between the first and second pipes.

The disclosed joint restraint 105 is a dual-function device. As discussed, the joint restraint 105 seals and retrains the joint of the first and second pipes. The restraint gripping of the pipe follows a two-step mechanical action.

In FIG. 6A, the joint restraint 105 is shown in a partially installed configuration. The joint restraint 105 and packing material 160 have been assembled onto the first pipe 110 and the nuts 182 and the bolts 175 have been tightened to secure the joint restraint 105 to the second pipe 115. At this point, the pipe pressing member 260 has been threaded onto the threaded portion 250 of the collar bolt 235 such that the pipe pressing member 260 is positioned on the threaded portion 250 proximate to the flange 245 such that the pipe pressing member 260 is not in contact with the first pipe 110. In one or more embodiments, the pipe pressing member 260 may be in contact with the first pipe 110 in the partially installed configuration but has not yet reached an initial pipe holding force.

In FIG. 6B, the joint restraint 105 is shown in an installed configuration. In FIG. 6B, each twist-off nut 305 has been rotated until the twist-off nut 305 sheared off, thereby obtaining the initial pipe holding force. As the torque limiting twist-off nuts 305 are turned, the reverse-threaded pipe pressing member 260 is backed-off of the threaded portion 250 of the collar bolt 235. As the pipe pressing member 260 is backed-off of the collar bolt 235, the pipe pressing member 260 is pressed against the first pipe 110 and the flange 245 of the collar bolt 235 is pressed against the internal side 225 of the radially outer wall 200. Each twist-off nut 305 ultimately fails in torsional shear at a prescribed torque at which point gripping edges 270 of the pipe-pressing member 260 are pressed and set against the outer surface of the first pipe 110 in a manner that provides sufficient initial grip on the first pipe 110 to prevent slippage or relative movement between the wedge assembly 135 and the first pipe 110.

In FIG. 6C, the joint restraint 105 is shown in an operational configuration. After the initial pipe holding force is obtained by torquing down each twist off nut 305, the pipeline is pressurized. The pressurization of the pipeline urges the joint to separate, which causes the wedge assembly 135 to be forced rearward within the housing block 185, as shown in FIG. 6C. Depending on the flow direction of the fluid through the pipe junction assembly 100, either the wedge assembly 135 and the first pipe 110 will move relative to the rest of the joint restraint 105 and relative to the second pipe 115, or the joint restraint 105 and the second pipe 115 will move relative to the wedge assembly 135 and relative to the first pipe 110. The initial pipe holding force ensures the wedge assembly 135 and the first pipe 110 move together.

In FIG. 6C, arrow A indicates the flow direction of the fluid through the pipe junction assembly 100 in one or more embodiments. In FIG. 6C, arrow A indicates that, as a result of the flow direction of the fluid, the first pipe 110 and the wedge assembly 135 move relative to the rest of the joint restraint 105 and relative to the second pipe 115. Because the flow direction is from right to left in FIG. 6C, the first pipe 110 is urged to separate from and move relative to the second pipe 115 and relative to the joint restraint 105. As the first pipe 110 moves relative to the second pipe 115, the wedge assembly 135 moves with the first pipe 110 and thus is urged rearward within the housing block 185.

The relative movement between the wedge assembly 135 and the housing block 185 induces a radial inward force while engaging in rearward travel due to the inclined plane surface of the radially outer wall 200 of the housing block 185 in which the wedge assembly 135 resides. As the wedge assembly 135 moves rearward in the housing block 185, the gripping edges 270 of the pipe-pressing member 260 further engage the outer surface of the first pipe 110, adding more restraint force to the initial grip (i.e., the initial pipe holding force). In the embodiment shown in FIG. 6C, the gripping edges 270 of the pipe-pressing member 260 dig into, bite into, or eat into the outer surface of the first pipe 110. The ultimate gripping force developed by the initial pipe holding force plus the actuation-forced grip define the ultimate pressure resistance and rating of the device.

The more dominate of the two forces is the actuation force due to the inclined plane rather than the initial torque induced force. Without this wedging action, the total performance of the joint restraint is significantly reduced; however, the wedging action is predicated on the initial grip holding sufficiently enough to slidably engage the inclined plane. Thus, once the initial grip is sufficient to initiate the wedging action without slippage of the wedge assembly relative to the first pipe, it is beneficial to encourage this wedging action by reasonable means. Reducing the frictional resistance of sliding by reducing the coefficient of friction between the sliding contact surfaces of the collar bolt and the block housing is therefore beneficial.

A significant reduction in the sliding friction is promoted by the use of the low friction material positioned between the annular flange of the collar bolt and the internal side of the outer wall of the housing block. In some embodiments, as disclosed above, this low friction material may take the form of the cap inserted over the upper portion of the collar bolt and wrapping over the outer radial edge of the annular flange to keep it in place.

Figures 7A, 7B:
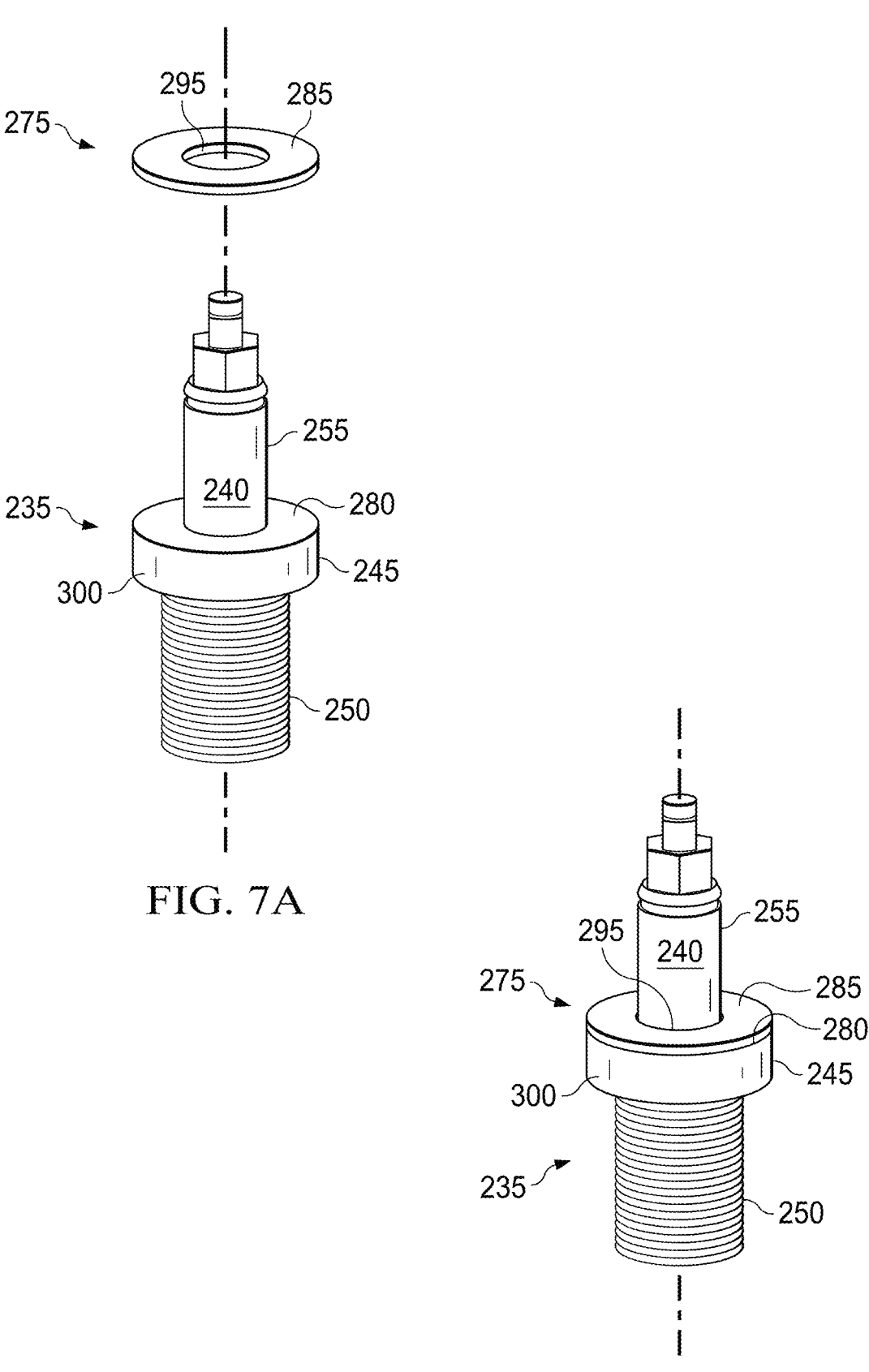
FIG. 7A illustrates an exploded view of another embodiment of the cap of the wedge assembly of FIG. 3A, according to one or more embodiments.
FIG. 7B illustrates the another embodiment of the cap of the wedge assembly of FIG. 7A in an assembled configuration, according to one or more embodiments.

FIG. 7A illustrates an exploded view of another embodiment of the cap 275 and of the collar bolt 235. FIG. 7B illustrates an assembled view of the another embodiment of the cap 275 and of the collar bolt 235. The embodiment of the cap 275 and the collar bolt 235 shown in FIGS. 7A and 7B may be part of the joint restraint 105, instead of the corresponding embodiment of the cap 275 and the collar bolt 235 shown in the figures preceding FIGS. 7A and 7B; in several embodiments, the operation of the joint restraint 105 with the embodiment of the cap 275 and the collar bolt 235 shown in FIGS. 7A and 7B is identical to the above-described operation of the joint restraint 105, which is described with reference to the figures preceding FIGS. 7A and 7B, including the embodiment of the cap 275 and the collar bolt 235 shown in the figures preceding FIGS. 7A and 7B. In the embodiment shown in FIGS. 7A and 7B, the cap 275 includes a substantially disk-shaped top portion, such as top wall 285, with an opening 295 (or hole) extending through the center of the top wall 285, but the cap 275 does not include any side portion extending from either an outer radial edge of the top wall 285 or otherwise. The opening 295 extending through the top wall 285 is sized to receive the upper portion 255 of the collar bolt 235 so that the cap 275 may be installed from the top of the collar bolt 235 and positioned down around the upper portion 255 of the collar bolt 235. In one or more embodiments, the cap 275 includes or is made of a low friction material, as described above.

In one or more embodiments, the cap 275 may include one or more segments or pieces. In one or more embodiments, the cap 275 may be mounted, fastened, or adhered to the upper surface 280 of the flange 245 and/or to the internal side 225 of the radially outer wall 200. In one or more embodiments, the cap 275 may include one or more pieces or strips that may be mounted, fastened, or adhered to a portion of the upper surface 280 of the flange 245 and/or to the internal side 225 of the radially outer wall 200. In one or more other embodiments, a low friction material may be sprayed, coated, or dipped onto the flange 245 and/or the internal side 225 of the radially outer wall 200. In one or more embodiments, the cap 275 or the top wall 285 of the cap may have a diameter that is less than or equal to a diameter of the flange 245.

In one or more embodiments, instead of having the disk shape or circular shape as shown in FIGS. 7A and 7B, the cap 275 of the embodiment shown in FIGS. 7A and 7B has a square shape, a rectangular shape, a hexagonal shape, an oval shape, or another shape.

In one or more embodiments, the low friction material may be an ultra-high molecular weight polyethylene (UHMW), but other materials are contemplated. In one or more other embodiments, the low friction material may be nylon. In one or more other embodiments, the low friction material may include one or more of UHMW, nylon, one or more other low friction materials, or any combination thereof.

The present disclosure introduces a joint restraint assembly for a pipe, the joint restraint assembly including: an annular body including a wedge housing, the wedge housing including: a housing block; an opening extending from a radially interior surface of the annular body into at least a portion of the housing block; and an interior surface of the housing block, wherein the interior surface is defined by the opening and inclined with respect to the axial extension of the annular body; and a wedge assembly received within the opening of the wedge housing of the annular body, the wedge assembly including: a bolt including a flange; a low-friction material positioned between the flange and the interior surface of the housing block, and adapted to slidably engage the interior surface of the housing block during relative movement between the wedge assembly and the wedge housing; and a wedge member attached to the bolt so that the flange is positioned between at least a portion of the low-friction material and at least a portion of the wedge member, wherein the wedge member is adapted to engage the pipe. In an embodiment, the joint restraint assembly includes: a plurality of wedge housings including the wedge housing, the plurality of wedge housings being distributed equally about the annular body; and a plurality of wedge assemblies including the wedge assembly, each of the plurality of wedge assemblies being received within a respective one of the plurality of wedge housings. In an embodiment, the joint restraint assembly includes a cap including the low-friction material and positioned on the flange, wherein a top portion of the cap is positioned on an upper surface of the flange adjacent the interior surface of the housing block. In an embodiment, the low-friction material includes ultra-high molecular weight polyethylene (UHMW) and/or nylon. In an embodiment, the cap further includes a side portion extending from an outer radial edge of the top portion; wherein the side portion of the cap extends around an outer surface of the flange along at least a portion of a longitudinal length of the flange; and wherein the side portion of the cap facilitates retention of the cap on the flange. In an embodiment, the bolt further includes an upper portion extending above the upper surface of the flange opposite a lower portion of the bolt; wherein the wedge housing further includes a hole extending through the interior surface of the housing block in communication with the opening of the wedge housing; and wherein the hole is sized such that the upper portion of the bolt extends through the hole and such that the flange is prevented from extending through the hole. In an embodiment, the cap further includes a hole extending through the top portion; and wherein the cap is assembled onto the flange such that the upper portion of the bolt extends through the hole in the top portion of the cap and further facilitates the retention of the cap on the flange. In an embodiment, the joint restraint assembly includes a coating including the low-friction material applied to an upper surface of the flange adjacent the interior surface of the housing block.

The present disclosure also introduces a system including: a joint restraint assembly, the joint restraint assembly including: an annular body including a wedge housing, the wedge housing including: a housing block; an opening extending from a radially interior surface of the annular body into at least a portion of the housing block; and an interior surface of the housing block, wherein the interior surface is defined by the opening and inclined with respect to the axial extension of the annular body; and a wedge assembly received within the opening of the wedge housing of the annular body, the wedge assembly including: a bolt including a flange; a low-friction material positioned between the flange and the interior surface of the housing block, and adapted to slidably engage the interior surface of the housing block during relative movement between the wedge assembly and the wedge housing; and a wedge member attached to the bolt so that the flange is positioned between at least a portion of the low-friction material and at least a portion of the wedge member; a first pipe received through the annular body of the joint restraint assembly; and a second pipe including an enlarged mouth and an annular flange formed at an end portion of the enlarged mouth; wherein a portion of the first pipe is received within the enlarged mouth of the second pipe; and wherein the annular body of the joint restraint assembly is attached to the annular flange of the second pipe via a plurality of fasteners. In an embodiment, the system includes a packing material positioned around the first pipe and within the enlarged mouth to facilitate sealing engagement of the first and second pipe. In an embodiment, the wedge assembly of the joint restraint assembly further includes: a cap including the low-friction material and positioned on the flange of the bolt, wherein a top portion of the cap is positioned on an upper surface of the flange adjacent the interior surface of the housing block. In an embodiment, the cap further includes a side portion extending from an outer radial edge of the top portion; wherein the side portion of the cap extends around an outer surface of the flange along at least a portion of a longitudinal length of the flange; and wherein the side portion of the cap facilitates retention of the cap on the flange. In an embodiment, the bolt further includes an upper portion extending above the upper surface of the flange opposite a lower portion of the bolt; wherein the wedge housing further includes a hole extending through the interior surface of the housing block in communication with the opening of the wedge housing; and wherein the hole is sized such that the upper portion of the bolt extends through the hole and such that the flange is prevented from extending through the hole. In an embodiment, the cap further includes a hole extending though the top portion; and wherein the cap is assembled onto the flange such that the upper portion of the bolt extends through the hole in the top portion of the cap and further facilitates the retention of the cap on the flange. In an embodiment, the system includes a coating including the low-friction material applied to an upper surface of the flange adjacent the interior surface of the housing block.

The present disclosure also introduces a method of installing a joint restraint assembly, including: assembling a wedge assembly of the joint restraint assembly, including: threading a wedge member onto a lower portion of a bolt; and positioning a cap including a low-friction material onto a flange of the bolt; inserting the wedge assembly into a wedge housing of an annular body of the joint restraint assembly; wherein the wedge housing includes an interior surface that is inclined with respect to the axial extension of the annular body; and wherein, when the wedge assembly is inserted into the wedge housing: the cap is positioned between the annular flange and the interior surface of the wedge housing, and adapted to slidably engage the interior surface of the wedge housing during relative movement between the wedge assembly and the wedge housing; and an upper portion of the bolt extends through a hole extending through the interior surface of the wedge housing; and threading a nut onto the upper portion of the bolt extending through the hole extending through the interior surface such that the wedge assembly is retained within the wedge housing. In an embodiment, the method includes inserting a first pipe through the annular body of the joint restraint assembly; inserting an end of the first pipe into an enlarged mouth portion of a second pipe; wherein an end of the enlarged mouth portion of the second pipe includes an annular flange; and attaching the annular body of the joint restraint assembly to the annular flange of the second pipe using a plurality of fasteners. In an embodiment, the method includes positioning a packing material around the first pipe and within the enlarged mouth portion of the second pipe. In an embodiment, the method includes pressurizing the first and second pipes; wherein pressurizing the first and second pipes forces the wedge assembly to slide along the interior surface of the wedge housing; and wherein the incline of the interior surface of the wedge housing forces the wedge member downward onto the first pipe as the wedge assembly slides relative to the interior wall of the wedge housing. In an embodiment, positioning the cap onto the flange of the bolt includes extending the upper portion of the bolt through a hole extending through the cap and sliding the cap down onto the flange.

The present disclosure also introduces an apparatus, which apparatus has been described according to one or more aspects of the present disclosure.

The present disclosure also introduces one or more other joint restraint assemblies, which have been described according to one or more aspects of the present disclosure.

The present disclosure also introduces one or more other systems, which have been described according to one or more aspects of the present disclosure.

The present disclosure also introduces one or more other methods, which have been described according to one or more aspects of the present disclosure.

The present disclosure also introduces an assembly, which assembly has been described according to one or more aspects of the present disclosure.

The present disclosure also introduces a kit, which kit has been described according to one or more aspects of the present disclosure.

The present disclosure also introduces an anchor bolt, which anchor bolt has been described according to one or more aspects of the present disclosure.

The present disclosure also introduces a cap, which cap has been described according to one or more aspects of the present disclosure.

The present disclosure also introduces a mechanical joint restraint, which mechanical joint restraint has been described according to one or more aspects of the present disclosure.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the embodiments disclosed above, or variations thereof, may be combined in whole or in part with any one or more of the other embodiments described above, or variations thereof.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A joint restraint assembly for a pipe, the joint restraint assembly comprising:
an annular body comprising a wedge housing, the wedge housing comprising:
a housing block;
an opening extending from a radially interior surface of the annular body into at least a portion of the housing block; and
an interior surface of the housing block, wherein the interior surface is defined by the opening and inclined with respect to an axial extension of the annular body; and
a wedge assembly received within the opening of the wedge housing of the annular body, the wedge assembly comprising:
a bolt comprising a flange;
a low-friction material positioned between the flange and the interior surface of the housing block, and adapted to slidably engage the interior surface of the housing block during relative movement between the wedge assembly and the wedge housing; and
a wedge member attached to the bolt so that the flange is positioned between at least a portion of the low-friction material and at least a portion of the wedge member, wherein the wedge member is adapted to engage the pipe.

2. The joint restraint assembly of claim 1, further comprising:
a plurality of wedge housings including the wedge housing, the plurality of wedge housings being distributed equally about the annular body; and
a plurality of wedge assemblies including the wedge assembly, each of the plurality of wedge assemblies being received within a respective one of the plurality of wedge housings.

3. The joint restraint assembly of claim 1, further comprising:

a cap comprising the low-friction material and positioned on the flange, wherein a top portion of the cap is positioned on an upper surface of the flange adjacent the interior surface of the housing block.

4. The joint restraint assembly of claim 3,
wherein the low-friction material comprises ultra-high molecular weight polyethylene (UHMW) and/or nylon.

5. The joint restraint assembly of claim 3,
wherein the cap further comprises a side portion extending from an outer radial edge of the top portion;
wherein the side portion of the cap extends around an outer surface of the flange along at least a portion of a longitudinal length of the flange; and
wherein the side portion of the cap facilitates retention of the cap on the flange.

6. The joint restraint assembly of claim 3,
wherein the bolt further comprises an upper portion extending above the upper surface of the flange opposite a lower portion of the bolt;
wherein the wedge housing further comprises a hole extending through the interior surface of the housing block in communication with the opening of the wedge housing; and
wherein the hole is sized such that the upper portion of the bolt extends through the hole and such that the flange is prevented from extending through the hole.

7. The joint restraint assembly of claim 6,
wherein the cap further comprises a hole extending through the top portion; and
wherein the cap is assembled onto the flange such that the upper portion of the bolt extends through the hole in the top portion of the cap and facilitates the retention of the cap on the flange.

8. The joint restraint assembly of claim 1, further comprising:
a coating comprising the low-friction material applied to an upper surface of the flange adjacent the interior surface of the housing block.

9. A system, comprising:
a joint restraint assembly, the joint restraint assembly comprising:
an annular body comprising a wedge housing, the wedge housing comprising:
a housing block;
an opening extending from a radially interior surface of the annular body into at least a portion of the housing block; and
an interior surface of the housing block, wherein the interior surface is defined by the opening and inclined with respect to an axial extension of the annular body; and
a wedge assembly received within the opening of the wedge housing of the annular body, the wedge assembly comprising:
a bolt comprising a flange;
a low-friction material positioned between the flange and the interior surface of the housing block, and adapted to slidably engage the interior surface of the housing block during relative movement between the wedge assembly and the wedge housing; and
a wedge member attached to the bolt so that the flange is positioned between at least a portion of the low-friction material and at least a portion of the wedge member;
a first pipe received through the annular body of the joint restraint assembly; and a second pipe comprising an enlarged mouth and an annular flange formed at an end portion of the enlarged mouth;

wherein a portion of the first pipe is received within the enlarged mouth of the second pipe; and wherein the annular body of the joint restraint assembly is attached to the annular flange of the second pipe via a plurality of fasteners.

10. The system of claim 9, further comprising:

a packing material positioned around the first pipe and within the enlarged mouth to facilitate sealing engagement of the first and second pipe.

11. The system of claim 9, wherein the wedge assembly of the joint restraint assembly further comprises:

a cap comprising the low-friction material and positioned on the flange of the bolt, wherein a top portion of the cap is positioned on an upper surface of the flange adjacent the interior surface of the housing block.

12. The system of claim 11, wherein the cap further comprises a side portion extending from an outer radial edge of the top portion;

wherein the side portion of the cap extends around an outer surface of the flange along at least a portion of a longitudinal length of the flange; and wherein the side portion of the cap facilitates retention of the cap on the flange.

13. The system of claim 11, wherein the bolt further comprises an upper portion extending above the upper surface of the flange opposite a lower portion of the bolt;

wherein the wedge housing further comprises a hole extending through the interior surface of the housing block in communication with the opening of the wedge housing; and wherein the hole is sized such that the upper portion of the bolt extends through the hole and such that the flange is prevented from extending through the hole.

14. The system of claim 13, wherein the cap further comprises a hole extending though the top portion; and wherein the cap is assembled onto the flange such that the upper portion of the bolt extends through the hole in the top portion of the cap and facilitates the retention of the cap on the flange.

15. The system of claim 9, further comprising:

a coating comprising the low-friction material applied to an upper surface of the flange adjacent the interior surface of the housing block.

16. A method of installing a joint restraint assembly, the method comprising:

assembling a wedge assembly of the joint restraint assembly, comprising:

threading a wedge member onto a lower portion of a bolt; and positioning a cap comprising a low-friction material onto a flange of the bolt;

inserting the wedge assembly into a wedge housing of an annular body of the joint restraint assembly;

wherein the wedge housing comprises an interior surface that is inclined with respect to an axial extension of the annular body; and wherein, when the wedge assembly is inserted into the wedge housing:

the cap is positioned between the annular flange and the interior surface of the wedge housing, and adapted to slidably engage the interior surface of the wedge housing during relative movement between the wedge assembly and the wedge housing; and an upper portion of the bolt extends through a hole extending through the interior surface of the wedge housing; and threading a nut onto the upper portion of the bolt extending through the hole extending through the interior surface such that the wedge assembly is retained within the wedge housing.

17. The method of claim 16, further comprising:

inserting a first pipe through the annular body of the joint restraint assembly;

inserting an end of the first pipe into an enlarged mouth portion of a second pipe;

wherein an end of the enlarged mouth portion of the second pipe comprises an annular flange; and attaching the annular body of the joint restraint assembly to the annular flange of the second pipe using a plurality of fasteners.

18. The method of claim 17, further comprising:

positioning a packing material around the first pipe and within the enlarged mouth portion of the second pipe.

19. The method of claim 17, further comprising:

pressurizing the first and second pipes;

wherein pressurizing the first and second pipes forces the wedge assembly to slide along the interior surface of the wedge housing; and wherein the incline of the interior surface of the wedge housing forces the wedge member downward onto the first pipe as the wedge assembly slides relative to the interior wall of the wedge housing.

20. The method of claim 19, wherein positioning the cap onto the flange of the bolt comprises extending the upper portion of the bolt through a hole extending through the cap and sliding the cap down onto the flange.

* * * * *